(12) United States Patent
Hewitt et al.

(10) Patent No.: US 7,690,599 B2
(45) Date of Patent: Apr. 6, 2010

(54) METHOD OF ILLUMINATION FOR IN-FLIGHT REFUELING

(75) Inventors: Gordon S. Hewitt, Trabuco Canyon, CA (US); Joseph David Shoore, Costa Mesa, CA (US)

(73) Assignee: The Boeing Company, Chicago, IL (US)

( * ) Notice: Subject to any disclaimer, the term of this patent is extended or adjusted under 35 U.S.C. 154(b) by 177 days.

(21) Appl. No.: 12/237,588

(22) Filed: Sep. 25, 2008

(65) Prior Publication Data

US 2009/0032711 A1    Feb. 5, 2009

Related U.S. Application Data

(62) Division of application No. 10/861,640, filed on Jun. 4, 2004, now Pat. No. 7,475,852.

(51) Int. Cl.
*B64D 39/00* (2006.01)
(52) U.S. Cl. .................................. 244/135 A
(58) Field of Classification Search ............. 244/135 A, 244/135 R; 356/141.1, 141.2, 141.3
See application file for complete search history.

(56) References Cited

U.S. PATENT DOCUMENTS

| | | |
|---|---|---|
| 3,917,196 A | 11/1975 | Pond et al. |
| 4,025,193 A | 5/1977 | Pond et al. |
| 4,298,176 A | 11/1981 | Kendall |
| 4,398,685 A | 8/1983 | Task et al. |
| 4,816,828 A | 3/1989 | Feher |
| 4,862,164 A | 8/1989 | Croley et al. |
| 5,005,005 A | 4/1991 | Brossia et al. |
| 5,326,052 A | 7/1994 | Krispin et al. |
| 5,539,624 A | 7/1996 | Dougherty |
| 5,906,336 A | 5/1999 | Eckstein |
| 6,483,258 B2 | 11/2002 | Vo |
| 6,651,933 B1 | 11/2003 | von Thal et al. |
| 6,783,260 B2 | 8/2004 | Machi et al. |

OTHER PUBLICATIONS

Electrophysics® NightVision Laser Illuminators (ALS-40, ALS-20, ALS-5), Electrophysics Corp., Fairfield, NJ, USA.
U.S. Air Force Fact Sheet: LX-5 Later Diode Illuminator System, Air Force Research Laboratory, USA, Jan. 1998. (http://www.de.afrl.af.mil/Factsheets/LX-5.html).

*Primary Examiner*—Tien Dinh
(74) *Attorney, Agent, or Firm*—Alston & Bird LLP

(57) ABSTRACT

An illuminating system, device, and method are provided to illuminate an in-flight refueling operation involving a first aircraft, serving as a tanker aircraft and carrying the illuminating system of the present invention, and a second aircraft, entering an in-flight refueling position relative to the first aircraft. The system, device, and method of the present invention provide eye-safe, covert illumination suitable for illuminating the in-flight refueling position such that the second aircraft is illuminated upon entering the in-flight refueling position.

20 Claims, 3 Drawing Sheets

METHOD OF ILLUMINATION FOR IN-FLIGHT REFUELING

CROSS REFERENCE TO RELATED APPLICATIONS

This application is a divisional of U.S. application Ser. No. 10/861,640, filed Jun. 4, 2004, now U.S. Pat. No. 7,475,852 which is hereby incorporated herein in its entirety by reference.

FIELD OF THE INVENTION

The present invention relates generally to in-flight refueling, and specifically, providing an illuminating system, device, and method for illuminating an in-flight refueling operation between a first and second aircraft. The system, device, and method of the present invention further provide a predominantly near infra-red emission having an emission envelope defined so as to contain an in-flight refueling position relative to the first aircraft so as to covertly illuminate the in-flight refueling operation.

BACKGROUND OF THE INVENTION

In-flight refueling (or air-to-air refueling) is an important method for extending the range of aircraft traveling long distances over areas having no feasible landing or refueling points. Although in-flight refueling is a relatively common operation, especially for military aircraft, precise positioning of a second aircraft (the receiver aircraft, for example) with respect to a first aircraft (the tanker aircraft, for example) is required in order to provide a safe engagement of the first aircraft with the second aircraft for the dispensing of fuel. In-flight refueling operations often take place during low-light conditions, including operations at night and during inclement weather, such that it may be advantageous to illuminate the in-flight refueling operation by, for instance, providing lighting installed on the first aircraft to illuminate the second aircraft as it approaches the first aircraft for in-flight refueling. Such illumination may aid, for instance a refueling system operator onboard the first aircraft, in visualizing the second aircraft as it approaches for an in-flight refueling operation.

There are currently two primary systems for in-flight refueling. One system is the boom refueling system. The boom refueling system typically comprises a rigid boom extended from a refueling aircraft. At one end of the boom is a refueling nozzle and adjacent the refueling nozzle are airfoils, which are controlled by a refueling system operator such as, for instance, a boom operator, on the refueling aircraft. The airfoils provide maneuverability of the boom with respect to an aircraft that is to be refueled. For the aircraft that is to be refueled, the second aircraft, the operator of the second aircraft must maneuver the second aircraft to within an in-flight refueling position, below and aft of the first aircraft. Upon maneuvering into the in-flight refueling position, the boom operator controls the airfoils to position and mate the boom into a refueling connection on the second aircraft.

Another type of refueling system is the probe and drogue system. In the probe and drogue system, a refueling hose having a drogue disposed on one end is trailed behind first aircraft (the tanker aircraft). The second aircraft has a probe that is flown by its operator into the drogue. As the drogue typically moves away from the second aircraft as it approaches, great skill and maneuvering ability is required by the operator of the second aircraft to mate the probe with the drogue. It is preferable, in the probe and drogue system, for the second aircraft to approach and enter the in-flight refueling position relative to the first aircraft as in the boom system, except in this case, the operator of the second aircraft is also responsible for "flying" the second aircraft's probe directly into the trailing drogue, because the drogue lacks the control surfaces that are provided on the refueling boom. The refueling system operator may be responsible, however, for extending the drogue to a trailing position that is within a suitable range of the second aircraft, such that the operator of the second aircraft may safely mate the probe with the drogue.

For both types of in-flight refueling systems, the refueling system operator of the first aircraft may, in some cases (such as in remote airborne refueling operator (RARO) systems), be positioned remotely from the refueling equipment (including boom equipment and drogue equipment) such that the refueling system operator may view the in-flight refueling operation remotely via, for instance, a camera positioned to capture an image of the in-flight refueling operation and direct the image to a display that may be visible to the refueling system operator. In such RARO systems, for in-flight refueling operations often take place during low-light conditions, including operations at night and during inclement weather, it may be advantageous to illuminate the in-flight refueling operation by, for instance, providing lighting installed on the first aircraft to illuminate the second aircraft as it approaches the first aircraft for in-flight refueling such that the RARO camera may be capable of capturing images of the in-flight refueling operation.

Illuminating systems have been disclosed for illuminating in-flight refueling operations, including those involving a RARO system such that the refueling system operator may remotely view the in-flight refueling operation. However, in the disclosed illuminating systems, the lighting units used are tungsten filament lamps that produce emissions including large amounts of light in the visible wavelengths such that the illuminating system may hamper the vision of an operator of the second aircraft as it approaches the first aircraft for an in-flight refueling operation. Also, the visible light emissions produced by the tungsten filament lamps are not covert, and may be visible to hostile observers and/or aircraft. In addition, the tungsten filament lamps also have a relatively short useful life of only 200-300 hours and a large electrical power requirement. The tungsten filament lamps also produce a large amount of heat and may require diffusing and filtered optics that result may result in the lamps' emissions having a non-uniform illumination field.

Therefore, there exists a need for an illuminating system that provides eye-safe and covert illumination that is adapted to uniformly illuminate, for instance, an area to rear and aft of a first aircraft that may contain an in-flight refueling position. There also exists a need for an illumination system and device that produces eye-safe, covert emissions to provide illumination to an in-flight refueling position but that does not require a large electrical power supply or generate a large amount of excess heat. There also exists a need for an illuminating system that comprises component parts that are reliable, durable, and suitable for carriage by a first aircraft configured to conduct in-flight refueling operations.

SUMMARY OF THE INVENTION

The embodiments of the present invention satisfy the needs listed above and provide other advantages as described below. The present invention provides an illuminating system, device, and method adapted to illuminate an in-flight refueling operation between a first aircraft and a second aircraft.

The illuminating system comprises an illuminating device carried by the first aircraft that is configured to provide an emission adapted to be predominantly in the near infra-red spectrum. The emission is further adapted to define an emission envelope containing an in-flight refueling position relative to the first aircraft so as to illuminate the second aircraft as it enters the in-flight refueling position.

According to other advantageous embodiments, the present invention may further comprise a generating device configured to generate the emission wherein the emission is eye-safe to an operator of the second aircraft, and a directing device configured to direct the emission to define the emission envelope containing the in-flight refueling envelope. According to some embodiments, the generating device may further comprise a laser diode illuminator that may, in turn, be configured to provide an emission that predominantly has a single wavelength. In some embodiments, the directing device may further comprise an adjusting device configured to adjust a breadth of the emission envelope.

The embodiments of the present invention also provide a method for illuminating an in-flight refueling operation between a first aircraft and a second aircraft. According to one embodiment, the method comprises generating an emission onboard the first aircraft that is predominantly in a near infra-red spectrum and eye-safe to an operator of the second aircraft. In addition, the method may further comprise directing the emission to an in-flight refueling position relative to the first aircraft such that the emission defines an emission envelope containing the in-flight refueling position so as to illuminate the second aircraft as the second aircraft enters the in-flight refueling position.

Advantages provided by embodiments of the present invention may include, but are not limited to, the provision of eye-safe, covert illumination to illuminate an in-flight refueling operation between a first aircraft and a second aircraft, and the ability to adjust a breadth of an illumination area so as to tailor the illumination area to enclose an in-flight refueling position relative to the first aircraft without being unnecessarily large. Other advantages include providing such illumination from a generating device that provides emissions having predominantly a single wavelength that are both eye-safe and covert. Embodiments of the present invention also provide the advantage of providing a generating device that: is lightweight and durable, requires small amounts of power, and generates only small amounts of heat in providing illuminating emissions.

These advantages and others that will be evident to those skilled in the art are provided in the illuminating system, device, and method of the present invention.

BRIEF DESCRIPTION OF THE DRAWINGS

Figure 1:
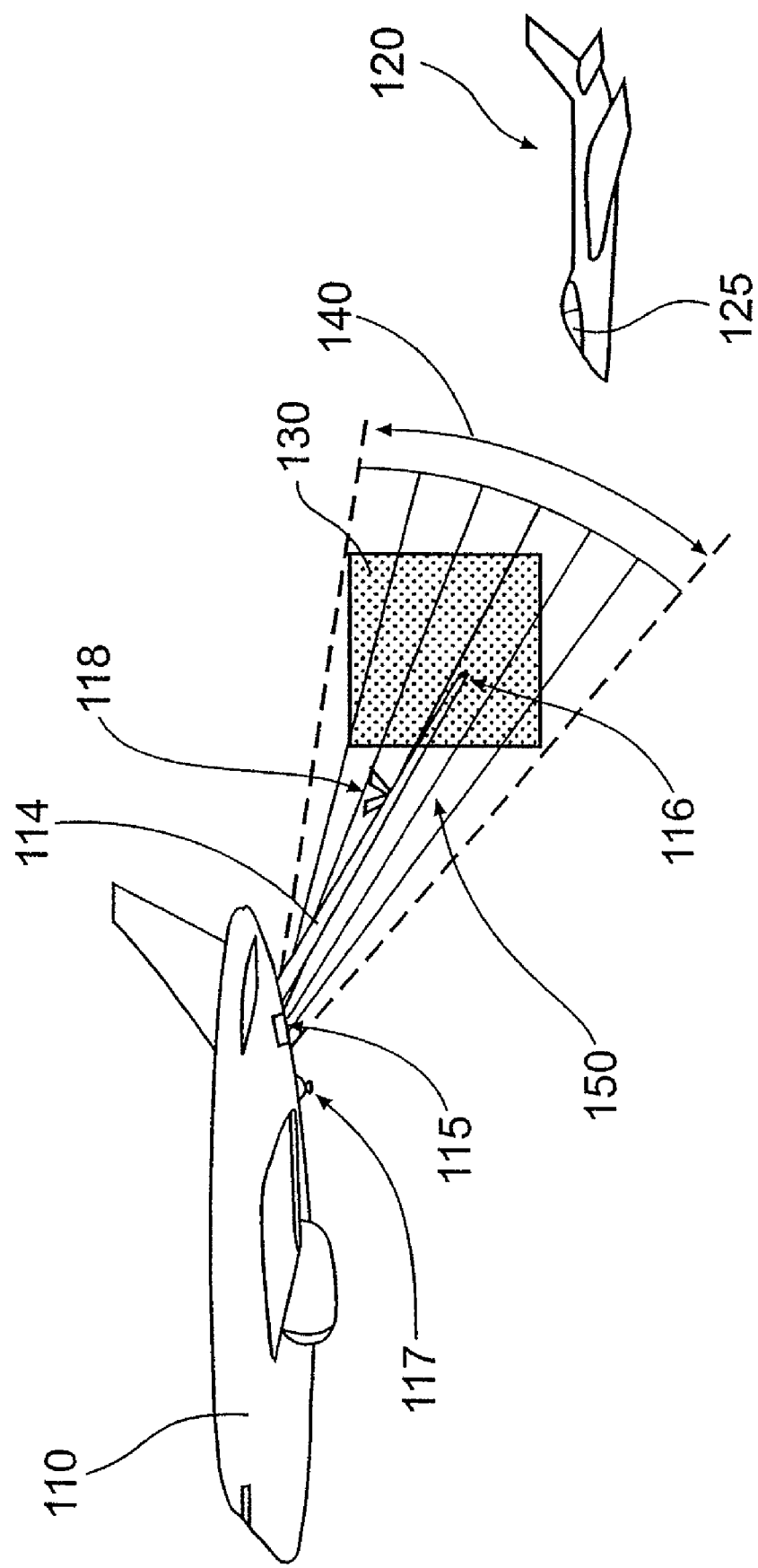
Figure 2:
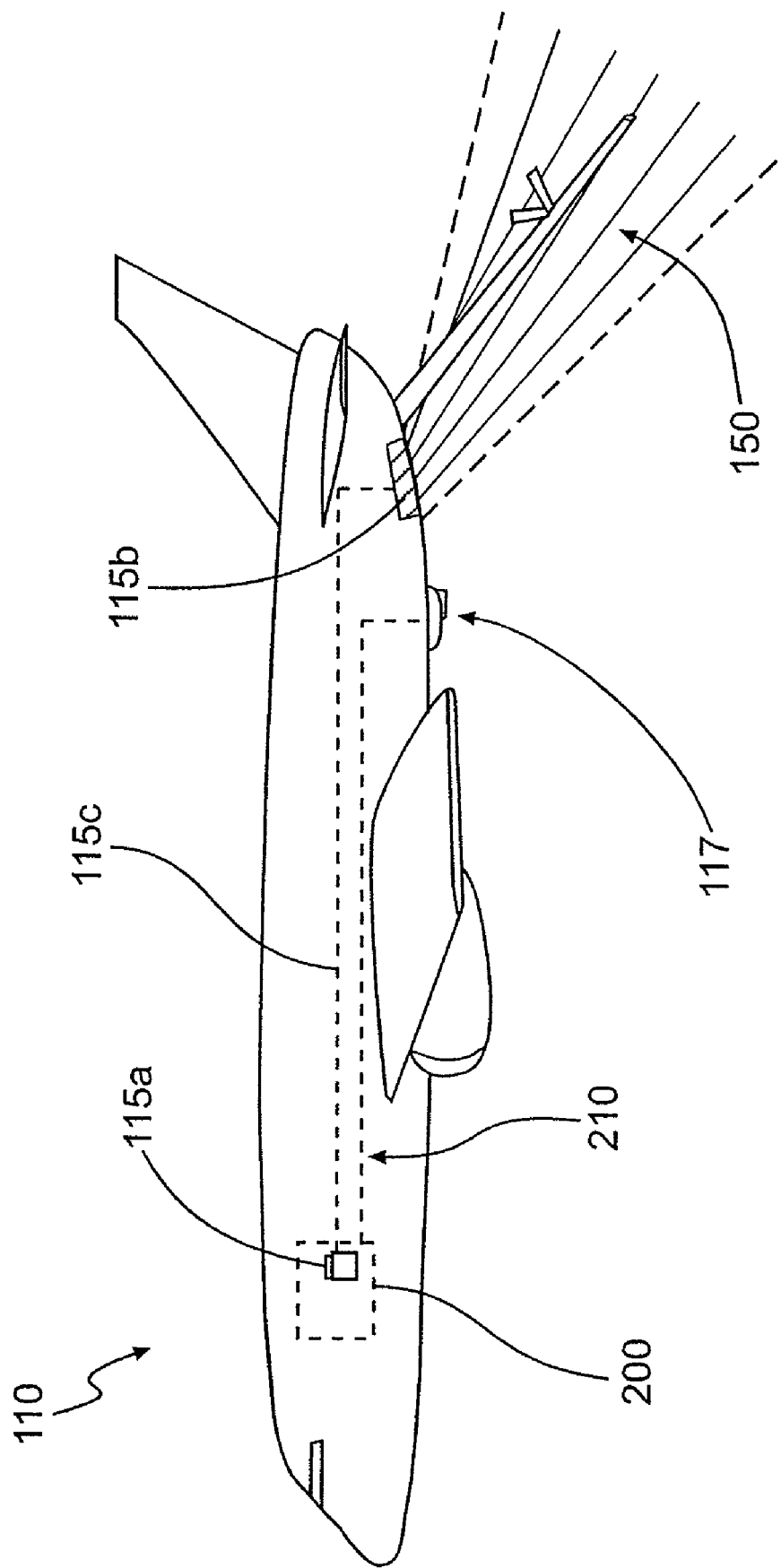
Figure 3:
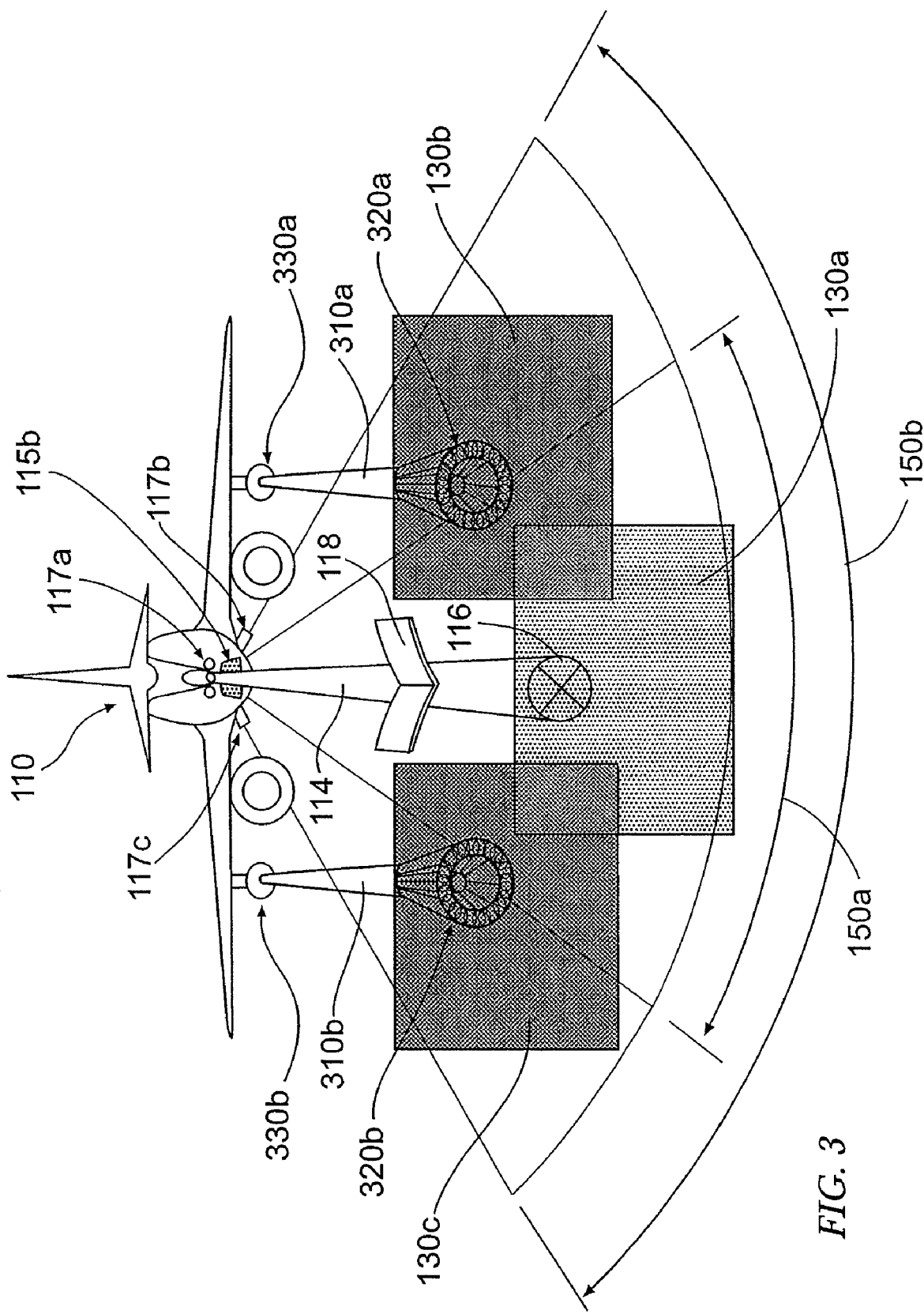

Having thus described the invention in general terms, reference will now be made to the accompanying drawings, which are not necessarily drawn to scale, and wherein:

FIG. 1 shows a side view of the first aircraft, and an in-flight refueling position relative to the first aircraft superimposed upon a schematic of an emissions envelope according to one embodiment of the illuminating system;

FIG. 2 shows a side view of the first aircraft with schematic representations of the generating and directing devices of the illuminating device according to one embodiment of the illuminating system; and FIG. 3 shows a view from the rear of a first aircraft showing dual pod-based drogue refueling systems carried by the first aircraft superimposed upon a view of respective in-flight refueling positions relative to the pods and an emission envelope provided by an illuminating device carried by the first aircraft.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While the positioning system, device, and method embodiments of the present invention are described below in the context of in-flight refueling operations, involving a first aircraft 110 (serving as a tanker aircraft) and a second aircraft 120 (serving as a receiver aircraft), it should be understood that the embodiments of the present invention may also be utilized to illuminate a second aircraft approaching a position relative to a first aircraft for a variety of in-flight operations, including, but not limited to, covert illumination for precision formation flying, covert illumination for identification of the second aircraft, search operations, and other applications requiring illumination of a second aircraft by an illuminating system carried by a first aircraft. It should also be understood that the embodiments of the present invention may also be utilized to illuminate a second aircraft approaching a position relative to a first aircraft, wherein the second aircraft is a manned aircraft or alternatively, wherein the second aircraft is an unmanned aircraft, such as, for instance, a UAV.

FIG. 1 depicts a schematic of the illuminating system of the present invention according to one embodiment of the invention wherein the illuminating device 115 is carried by a first aircraft 110 (serving as a tanker aircraft) to illuminate an in-flight refueling operation between a first aircraft 110 and a second aircraft 120. The illuminating device 115 may be configured to provide an emission, predominantly in the near infra-red spectrum, wherein the emission may further define an emission envelope 150 containing an in-flight refueling position 130 relative to the first aircraft 110 such that the second aircraft 120 (serving as a receiver aircraft), may be illuminated by the emission as the second aircraft 120 approaches and/or enters the in-flight refueling position 130. As shown in FIG. 1, the in-flight refueling position 130 may be located below and aft of a rear portion of a fuselage of the first aircraft 110. Thus, the second aircraft 120 may approach the in-flight refueling position 130 from below and aft of the first aircraft 110 so as to avoid potentially dangerous turbulence and disturbances in air flow created by, for instance, the control surfaces and engines of the first aircraft 110.

The term "emission envelope" 150 as used herein may be defined as the spatial region, typically to the aft of and below the first aircraft 110, wherein an emission provided by the illuminating device 115 is adapted to illuminate the second aircraft 120 as it approaches the in-flight refueling position 130 relative to the first aircraft. More particularly, the illuminating device 115 is carried by the first aircraft 110 (serving as, for instance, a tanker aircraft) so as to provide an emission to covertly illuminate the second aircraft 120 when the second aircraft 120 is positioned within the emission envelope 150. According to some advantageous embodiments, the illuminating device 115 is attached to the first aircraft 110 on a lower surface of a fuselage of the first aircraft so as to provide an emission envelope 150 that extends below and aft of the first aircraft 110 as shown in FIG. 1. In other embodiments, the illuminating device 115 may be attached directly to a refueling pod (330*a*, 330*b*, FIG. 3) that may further be attached to a wing hardpoint on a first aircraft 110 such that the signal envelope 150*b* extends wide enough to enclose an in-flight refueling position 130*b*, 130*c* relative to a refueling pod 330*a*, 330*b* (as shown, for instance in FIG. 3). In other advantageous embodiments, the illuminating device 115 may be positioned either aft or forward of the refueling equipment so as to provide an emission envelope adapted to illuminate the second aircraft 120 as it approaches any one of the following refueling systems that may be carried by the first aircraft 110: boom refueling systems extending from a centerline of the first aircraft 110, probe and drogue refueling systems extending from the centerline of the first aircraft 110, and/or pod-based probe and drogue refueling systems 330*a*, 330*b* extending from a pod that may be carried on a wing hardpoint of the first aircraft 110. In some embodiments, the illuminating device 115 (as further described herein) may be packaged as a removable attachment that may be selectively attached to the first aircraft 110. In other embodiments, the illuminating device 115 may be attached in a conformal arrangement with the fuselage of the first aircraft 110 in, for instance, recesses defined by the fuselage of the first aircraft, 110 such that the illuminating device 115 creates minimal additional aerodynamic drag or disturbances when the first aircraft 110 is in flight. In other embodiments, the illuminating device 115 may be carried by the first aircraft in a variety of positions and configurations such that the emission envelope 150 is adapted to enclose the in-flight refueling position 130 such that the second aircraft 120 may be illuminated as it approaches and/or enters the in-flight refueling position 130 relative to the first aircraft.

In the embodiment shown in FIG. 1, the first aircraft 110 may also carry an imaging device 117, such as, for instance, a near infra-red capable camera, such that as the second aircraft 120 enters the emission envelope 150 and is illuminated by the predominantly near infra-red emissions therein, the imaging device 117 may capture an image of the second aircraft 120 such that the second aircraft 120 may be viewed by, for instance, a refueling system operator on board the first aircraft 110 so as to aid in the visualization of the in-flight refueling operation in low visibility in-flight refueling operations such as those occurring at night or in inclement weather. The imaging device may further comprise a RARO camera suitable for viewing images created by covert illumination such as the predominantly near infra-red emission provided by the illuminating device 115 of the present invention. Thus, the imaging device 117 may aid the refueling system operator in adjusting the position of the boom end 116 by, for instance, actuating airfoils 118 attached to the refueling boom 114, such that the boom end 116 is engaged with a fuel receptacle carried by the second aircraft 120. In other embodiments, the imaging device 117 may comprise, for instance, night vision goggles, worn by, for instance, the refueling system operator of the first aircraft 110 such that the refueling system operator may visualize the in-flight refueling operation as illuminated by the emission provided by the illuminating device 115 carried by the first aircraft 110.

While the embodiment of the illuminating system shown in FIG. 1 is depicted in use with a boom refueling system, one skilled in the art will appreciate that the illuminating system, device, and method of the embodiments of the present invention may also be used in conjunction with a probe and drogue refueling system such that an refueling system operator, for instance, onboard the first aircraft 110 may be aided in visualizing the in-flight refueling operation such that the refueling system operator may actuate a drogue such that the drogue may trail the first aircraft 110 at a distance suitable for engagement with a probe carried by a second aircraft 120 approaching the in-flight refueling position 130 relative to the first aircraft.

According to some embodiments, the illuminating device 115 may be configured to provide an emission defining an emission envelope 150 that is substantially broader than the in-flight refueling position 130 such that the refueling system operator onboard the first aircraft 110 may visualize the approach of the second aircraft 110 as it nears the in-flight refueling position 130. In other embodiments, the emission envelope 150 produced by the illuminating device 115 may be configured to have a breadth substantially smaller than the in-flight refueling position 130 so as to decrease the total emissions from the illuminating device 115. A signal envelope 150 having a narrower breadth may be preferable, for instance, during military in-flight refueling operations occurring in or near hostile airspace wherein the emission emitted from the illuminating device 115 may reveal the position of the first aircraft 110 to hostile aircraft or ground-based observers and/or sensors equipped with, for instance, near infra-red compatible sensing equipment. In other advantageous embodiments, the illuminating device 115 may be configured and/or positioned such that the emission envelope 150 produced by the illuminating device 115 is adjustable in breadth and strength. Embodiments of the illuminating device 115 having an adjustable emission envelope 150 may thus be configurable for both combat situations where low levels of emissions are preferred as well as for training situations or in-flight refueling operations in bad weather, wherein the provision of a broad emission envelope 150 may be useful for broadly illuminating an approach path of the second aircraft 120 as it approaches the in-flight refueling position 130. It should also be noted that according to some embodiments, the emission produced by the illuminating device 115 is in the near infra-red spectrum, such that the emission is inherently covert to hostile aircraft and/or ground observers that are not equipped with near infra-red compatible sensing equipment.

In the various embodiments described above, the imaging device 117 may be further configured to have a field of view 140 that is as broad as or broader than, the emission envelope 150 defined by the emission provided by the illuminating device 115. In some embodiments, such as that shown in FIG. 1 the field of view 140 of the imaging device 117 may be configured so as to be co-located with the emission envelope 150 so as to ensure that the refueling system operator onboard the first aircraft 110 may be able to visualize the in-flight refueling operation and/or the approach of the second aircraft 120 to the in-flight refueling position 130 as the second aircraft enters the signal envelope 150 defined by the covert, predominantly near infra-red emission provided by the illuminating device 115.

Also, an operator of the second aircraft 130 and/or sensors carried by the second aircraft 120 may be equipped with near infra-red capable imaging equipment, such as, for instance, night vision goggles, suitable for viewing the predominantly near infra-red emission provided by the illuminating device 115. Also, as the in-flight refueling position 130 is illuminated, an operator of the second aircraft 120, typically positioned behind a windscreen 125 in a cockpit positioned in the front of a fuselage of the second aircraft 120, may more clearly visualize the in-flight refueling operation in low visibility in-flight refueling operations such as those occurring at night or in inclement weather as a result of the near infra-red illumination. In addition, the emission provided by the illuminating device 115 carried by the first aircraft 110 may be further adapted to be predominantly in a near infra-red spectrum, such that the emission is predominantly outside the photopic and scotopic response of the human eye. Therefore, in instances where the operator of the second aircraft 120 is a human pilot and/or navigator, the emission may be less likely to interfere with, and/or impair the vision of the operator of the second aircraft 120 as the second aircraft 120 approaches and/or enters an in-flight refueling position 130 relative to the first aircraft 110. Further, some embodiments of the present invention, providing a predominantly near infra-red emission, may be more compatible with night vision goggles (NVG's) than, for instance, a visible light emission, which tends to at least partially saturate the images produced by the NVG's that are typically utilized by an operator of a second aircraft 120 when operating in low light conditions such as night operations or operations occurring during inclement weather.

FIG. 2 shows one embodiment of the illuminating system wherein the illuminating device 115 further comprises a generating device 115a configured to generate the emission and a directing device 115b configured to direct the emission such that the emission is adapted to define the emission envelope 150 containing an in-flight refueling position 130 (as shown, for instance in FIGS. 1 and 3). According to some embodiments, the generating device 115a may be located in a forward position within a fuselage of the first aircraft 110 such as, for instance, a RARO station 200, wherein a refueling system operator may be positioned to control the refueling system, the illuminating system, and the associated imaging device 117 used to capture images of the in-flight refueling operation and transmit the images to, for example, a display, located such that the refueling system operator may view the in-flight refueling operation as it is illuminated by the embodiments of the present invention.

The generating device 115a may comprise a laser diode illuminator configured to provide an emission has predominantly a single wavelength that is in, for instance, the near infra-red spectrum. For example, the generating device 115a may comprise a laser diode illuminator configured to provide an emission that predominantly has a single wavelength between about 810-812 nanometers such that the emission is predominantly outside both the photopic and scotopic response spectra of the human eye and predominantly within the near infra-red spectrum, wherein the infra-red spectrum may be generally defined as wavelengths between about 3-12 micrometers. The generating device 115a may further comprise, for instance, a power source, wherein the power source provides a power level such that the generating device may provide an emission suitable to define the desired emission envelope 200 and/or emission intensity. In some cases, a power source producing between about 5-40 watts may be suitable for supplying power to the generating device 115a. In addition, the laser diode illuminator may comprise a laser diode illuminator suitable for producing emissions having varying wavelengths both within and outside the infra-red, and near infra-red spectra. For instance, the laser diode illuminator may further comprise a laser diode suitable for providing emission wavelengths in the near infra-red spectrum, such as, for instance, the range of 792-812 nanometers, such as that produced by Thorlabs, Inc. part number ASM808-20CS available from Thorlabs, Inc., located in Newton, N.J. According to another example, the laser diode illuminator may be configured to produce emission wavelengths in the near infra-red spectrum such as the laser diode illuminator provided by Electrophysics, Inc. model number ALS-20, which is available commercially from Electrophysics, Inc., located in Fairfield, N.J.

Thus, the generating device 115a may be configured to produce an emission that may covertly illuminate, via predominantly near infra-red light, an in-flight refueling operation. The generating device 115a may be further configured to produce an emission that is "eye safe" to both an operator of the second aircraft 120 as well as other personnel that may be exposed to the emission, such as, for instance a refueling system operator onboard the first aircraft 110. The term "eye-safe" emission as used herein, more specifically refers to an emission that substantially complies with Class 1 eye safety levels and substantially complies with laser light safety standards defined in ANSI Z136.1. As shown in FIG. 2 the generating device 115a may be located within a fuselage of the first aircraft 110 such as, for instance, at a RARO (remote airborne refueling operator) station, such that the refueling system operator onboard the first aircraft may more closely monitor and control the generating device. Other advantages of locating the generating device 115a at an accessible location within the fuselage of the first aircraft 110 may include, but are not limited to: the ability to more easily access and change lighting elements (diodes, for instance) as they expire, the ability to manage the relatively small amount of heat generated by the generating device 115a using, for instance, a cooling system that is common to the other electronic equipment that may be located in the RARO station, and the ability to closely monitor the output and performance of the generating device 115a while the first aircraft 110 is in flight.

The illuminating device 115 may further comprise a directing device 115b configured to direct the emission such that the emission is adapted to define an emission envelope 150 containing an in-flight refueling position 130. The directing device may comprise, for instance, beam shaping lenses, diffusing optics, and/or sheet optics configured to further filter emission wavelengths beyond the emission wavelength generated by the generating device 115a that may be developed by the emission as it is transmitted to the directing device 115b as described more fully below. The directing device may also, in some embodiments, comprise a lens device covering an aperture defined in an underside of a fuselage of the first aircraft 110 as shown schematically in FIG. 2, such that the emission generated by the generating device 115a may be directed through the aperture via the lens device such that the emission defines the selected emission envelope 150. The directing device 115b may further comprise, for instance, an adjusting device configured to adjust a breadth of the emission envelope 150. In some advantageous embodiments, the adjusting device may comprise an iris configured to open and close around the directing device 115b so as to provide the emission such that the emission defines a variable emission envelope 150. In other embodiments, the adjusting device may be actuated remotely by, for instance, the refueling system operator, who may be located in a RARO station located within a fuselage of the first aircraft. The adjusting device may be advantageous in in-flight refueling operations where, for instance, the emission envelope 150 requires expansion so as to have the capability to illuminate a second aircraft 120 as it approaches an in-flight refueling position relative to a pod-based drogue refueling system 330a, 330b such as that shown in FIG. 3, wherein the in-flight refueling position may be positioned to the left and/or the right of the centerline of a fuselage of the first aircraft 110.

According to some embodiments, the emission may be transmitted from the generating device 115a to the directing device 115b, via a transmitting device 115c as shown schematically in FIG. 2. According to some embodiments, the transmitting device 115c may comprise fiber-optic cable configured to transmit the emission through a fuselage of the first aircraft 110 from the generating device 115a (which may be located, for instance, in a forward RARO station) to the directing device 115b, which may comprise, for instance, a lens device and an adjusting device covering an aperture defined in the fuselage of the first aircraft 110 as shown in FIG. 2. The transmitting device may also comprise, for instance, insulated fiber-optic cable attached in a conformal manner to an underside of a fuselage of the first aircraft 110 such that the fiber-optic cable may be more easily inspected, removed, and/or replaced as necessary. According to other embodiments, the transmitting device 115c may further comprise other energy transmission devices suitable for the transmission of the emission generated by the generating device 115a to the directing device 115b such that the emission is directed to define an emission envelope 150.

FIG. 3 shows a view of the first aircraft 110 from the rear and below from a perspective of, for instance, an operator of a second aircraft 120 approaching an in-flight refueling position 130a relative to a centerline of a fuselage of the first aircraft 110. For such an approach, the directing device 115b according to one embodiment of the present invention, may be configured to provide an emission defining a first emission envelope 150a adapted to illuminate the second aircraft 120 as it approaches the in-flight refueling position 130a. In addition, in this approach scenario, an aft-facing imaging device 117a, such as, for instance, a RARO near infra-red compatible camera, may be configured to capture images of the second aircraft 120 as it enters the first emission envelope 150a and becomes illuminated by the emission directed by the directing device 115b.

FIG. 3 also shows two alternate off-center in-flight refueling positions 130b, 130c relative to drogues 320a, 320b attached to fuel hoses 310a, 310b trailed from pod-based refueling systems 330a, 330b carried, for instance, on wing hardpoints that may be positioned on the underside of a wing of the first aircraft 110 as depicted in FIG. 3. The alternate off-center in-flight refueling positions 130b, 130c may be positioned aft and below of the first aircraft 110 but may be further positioned off a centerline of the first aircraft 110 to the right or left, respectively so that the alternate off-center in-flight refueling positions may be positioned aft of and below the respective pod-based refueling systems 330a, 330b. In order to illuminate a second aircraft 120 approaching one of the drogues 320a, 320b, the directing device 115b according to some embodiments of the present invention, may be further configured to provide an emission defining a broader second emission envelope 150b so as to enclose not only the centerline in-flight refueling position 130a, but also the two off-center in-flight refueling positions 130b, 130c relative to the pod-based refueling systems 330a, 330b carried by, for instance, the wings of the first aircraft 110 as shown in FIG. 3. For such an expanded second emission envelope 150b additional side-facing imaging devices 117b, 117c, such as, for instance, additional RARO near infra-red compatible cameras, may be provided and configured so as to capture images of the second aircraft 120 as it enters the second emission envelope 150b containing either or both of the off-center in-flight refueling positions 130b, 130c. Also, in alternate embodiments, additional side-facing directing devices 115b may be provided so as to provide an emission defining an emission envelope that contains the off-center in-flight refueling positions 130b, 130c. In other advantageous embodiments, the directing device 115b and imaging device 117a may be configured such that they may be capable of directing a relatively narrow emission envelope 150a to various positions so as to enclose and capture images of any one of the possible in-flight refueling positions 130a, 130b, or 130c relative to a first aircraft 110 equipped with both a centerline mounted refueling system (114, 116, 118) and two pod-based refueling systems (330a, 330b) mounted outboard on the underside of the wings of the first aircraft 110.

One skilled in the art will appreciate that the illuminating device 115, directing device 115b, and/or imaging device 117 may be mounted and/or selectively maneuvered such that the emission produced by the illuminating system may define a variable emission envelope 150 so as to tailor the emission envelope 150 to illuminate a second aircraft 120 as it approaches the first aircraft 110 from a variety of spatial positions relative to the first aircraft 110. In addition, more than one illuminating device 115, or directing device 115b may be provided so as to provide an emission defining an emission envelope that contains, for example, the off-center in-flight refueling positions 130b, 130c as well as, for instance, an in-flight refueling position 130a relative to a centerline of a fuselage of the first aircraft 110. The variable configurations of the illuminating system of the present invention may be followed by the imaging device 117 according to some embodiments of the present invention, such that the field of view of the imaging device 117 may be tailored to capture images of the second aircraft 120 as it is illuminated by an emission from the illuminating system of the present invention.

Referring again to FIGS. 2-3 a method for illuminating an in-flight refueling operation between a first aircraft 110 and a second aircraft 120 is described. One step comprises generating an emission from a generating device 115a carried by the first aircraft 110, wherein the generating device 115a is further configured such that the emission is adapted to be predominantly in the near infra-red spectrum and eye-safe to an operator of the second aircraft 120. An additional step comprises directing the emission to an in-flight refueling position relative to the first aircraft, so as to define an emission envelope 150 containing the in-flight refueling position 130 relative to the first aircraft 110 so as to illuminate the second aircraft 120 as the second aircraft 120 enters the in-flight refueling position 130. According to other embodiments of the method of the present invention, the method may further comprise transmitting the emission onboard the first aircraft 110 from the generating device 115a that generates the emission to a directing device 115b that directs the emission to the in-flight refueling position 130, such that the generating device 115a and the directing device 115b may be located remotely from one another. According to other embodiments, the method may further comprise the step of adjusting a breadth of the emission envelope 150 (see elements 150a, 150b of FIG. 3) via, for instance, the directing device 115b. In other embodiments, the generating step of the method may further comprise generating the emission such that the emission is further adapted to predominantly have a single wavelength, and wherein the single wavelength may be further adapted to be between about 810-812 nanometers. Thus, the generating step may provide an emission that is predominantly within the near infra-red spectrum such that the emission may be covert to the human eye and eye-safe to an operator of the second aircraft 120 approaching, for instance, an in-flight refueling position 130 illuminated by the illuminating system, device, and method of the present invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for illuminating an in-flight refueling operation between a first aircraft and a second aircraft comprising:
   providing a generating device both within an interior of the first aircraft and within a refueling operator station such that the generating device is accessible by an operator of the first aircraft while the first aircraft is in flight;
   generating an emission with the generating device that is predominantly in a near infra-red spectrum and such that the emission is eye-safe to an operator of the second aircraft;
   directing the emission with a directing device operably engaged with and disposed proximate to an outer surface of the first aircraft, wherein directing the emission comprises directing the emission to an in-flight refueling position relative to the first aircraft, wherein directing the emission comprises directing the emission to define an emission envelope containing the in-flight refueling position relative to the first aircraft so as to illuminate the second aircraft as the second aircraft enters the in-flight refueling position; and
   transmitting the emission from the generating device to the directing device located remote from the generating device.

2. A method according to claim 1, wherein directing the emission comprises directing the emission to define an adjustable emission envelope.

3. A method according to claim 2, further comprising adjusting a breadth of the emission envelope of the emission.

4. A method according to claim 1, wherein the generating step further comprises generating the emission such that the emission is further adapted to predominantly have a single wavelength.

5. A method according to claim 1, wherein the generating step further comprises generating the emission such that the emission is further adapted to predominantly have a single wavelength of between about 810-812 nanometers.

6. A method according to claim 1 further comprising capturing an image of at least a portion of the emission envelope.

7. A method according to claim 6 wherein the directing step comprises directing the emission to define a plurality of different emission envelopes, and wherein said capturing step comprises capturing respective images within different ones of the emission envelopes.

8. A method for illuminating an in-flight refueling operation between a first aircraft and a second aircraft comprising:
   providing a generating device both within an interior of the first aircraft and within a refueling operator station;
   generating an emission with the generating device that is predominantly in a near infra-red spectrum and such that the emission is eye-safe to an operator of the second aircraft;
   directing the emission with a directing device, wherein directing the emission comprises directing the emission to an in-flight refueling position relative to the first aircraft, wherein directing the emission comprises directing the emission to define an emission envelope containing the in-flight refueling position relative to the first aircraft so as to illuminate the second aircraft as the second aircraft enters the in-flight refueling position; and
   transmitting the emission from the generating device to the directing device located remote from the generating device.

9. A method according to claim 8, wherein directing the emission comprises directing the emission to define an adjustable emission envelope.

10. A method according to claim 9, further comprising adjusting a breadth of the emission envelope of the emission.

11. A method according to claim 8, wherein the generating step further comprises generating the emission such that the emission is further adapted to predominantly have a single wavelength.

12. A method according to claim 8, wherein the generating step further comprises generating the emission such that the emission is further adapted to predominantly have a single wavelength of between about 810-812 nanometers.

13. A method according to claim 8 further comprising capturing an image of at least a portion of the emission envelope.

14. A method according to claim 8 wherein the directing step comprises directing the emission to define a plurality of different emission envelopes, and wherein said capturing step comprises capturing respective images within different ones of the emission envelopes.

15. A method for illuminating an in-flight refueling operation between a first aircraft and a second aircraft comprising:
   providing an emission from a refueling operator station within the first aircraft that is predominantly in a near infra-red spectrum and such that the emission is eye-safe to an operator of the second aircraft;
   directing the emission with a directing device, wherein directing the emission comprises directing the emission to an in-flight refueling position relative to the first aircraft, wherein directing the emission comprises directing the emission to define an emission envelope containing the in-flight refueling position relative to the first aircraft so as to illuminate the second aircraft as the second aircraft enters the in-flight refueling position; and
   transmitting the emission from the refueling operator station to the directing device located remote therefrom.

16. A method according to claim 15, wherein directing the emission comprises directing the emission to define an adjustable emission envelope.

17. A method according to claim 16, further comprising adjusting a breadth of the emission envelope of the emission.

18. A method according to claim 15, wherein the providing step further comprises generating the emission such that the emission is further adapted to predominantly have a single wavelength.

19. A method according to claim 15, wherein the providing step further comprises generating the emission such that the emission is further adapted to predominantly have a single wavelength of between about 810-812 nanometers.

20. A method according to claim 15 wherein the directing step comprises directing the emission to define a plurality of different emission envelopes, and wherein the method further comprises capturing respective images within different ones of the emission envelopes.

* * * * *